(12) United States Patent
Carme (10) Patent No.: US 10,393,088 B2
(45) Date of Patent: Aug. 27, 2019

(54) INSTALLATION FOR THE RECOVERY OF ENERGY FROM SEA SWELL AND/OR THE ACTIVE ATTENUATION OF SAID SWELL

(71) Applicant: Christian Carme, Marseilles (FR)

(72) Inventor: Christian Carme, Marseilles (FR)

( * ) Notice: Subject to any disclaimer, the term of this patent is extended or adjusted under 35 U.S.C. 154(b) by 31 days.

(21) Appl. No.: 15/322,269

(22) PCT Filed: Jun. 30, 2015

(86) PCT No.: PCT/FR2015/051794
§ 371 (c)(1),
(2) Date: Dec. 27, 2016

(87) PCT Pub. No.: WO2016/001574
PCT Pub. Date: Jan. 7, 2016

(65) Prior Publication Data
US 2017/0145983 A1    May 25, 2017

(30) Foreign Application Priority Data
Jun. 30, 2014   (FR) ..................... 14 56225

(51) Int. Cl.
*F03B 13/14*    (2006.01)
*F03B 13/18*    (2006.01)

(52) U.S. Cl.
CPC .......... *F03B 13/188* (2013.01); *F03B 13/148* (2013.01); *F05B 2240/97* (2013.01);
(Continued)

(58) Field of Classification Search
CPC ...... F05B 2240/97; F03B 13/12; F03B 13/14; F03B 13/148; F03B 13/188; F03B 13/18; Y02E 10/28–38
(Continued)

(56) References Cited

U.S. PATENT DOCUMENTS 3,989,951 A * 11/1976 Lesster ................. F03B 13/148
290/53
6,389,764 B1 * 5/2002 Stubler .................. E01D 19/16
52/220.8
(Continued)

FOREIGN PATENT DOCUMENTS

FR   2906274 A1   3/2008
FR   2970524 A1   7/2012
(Continued)

OTHER PUBLICATIONS

International Search Report dated Jan. 5, 2016 in corresponding Application No. PCT/FR2015/051794; 12 pgs.

*Primary Examiner* — Mark A Laurenzi
*Assistant Examiner* — Mickey H France
(74) *Attorney, Agent, or Firm* — Maier & Maier, PLLC (57) ABSTRACT

The invention relates to an installation having at least one caisson positioned at a given depth in a marine environment, said caisson including a rigid tank in which an oscillating plate moves, said oscillating plate being adapted to oscillate in relation to a vertical axis depending on fluctuations in the height of the water column created by the swell perpendicular to the plate, said tank and plate defining a chamber. The installation is characterized in that the chamber is sealed by a flexible hermetic pouch which is filled with a gas and deforms according to the oscillations of the oscillating plate, the pressure of the gas inside the pouch being adjusted so as to compensate for all or part of the weight of the water column perpendicular to the plate in the absence of swell.

11 Claims, 9 Drawing Sheets

(52) U.S. Cl.
CPC ......... *F05B 2270/504* (2013.01); *Y02E 10/32* (2013.01); *Y02E 10/38* (2013.01)

(58) Field of Classification Search
USPC ...... 60/495–507; 417/100, 330–337; 290/42, 290/53
See application file for complete search history.

(56) References Cited

U.S. PATENT DOCUMENTS

| | | | |
|---|---|---|---|
| 9,038,433 B2* | 5/2015 | Skjetne | F16L 55/04 73/1.71 |
| 2007/0253841 A1* | 11/2007 | Burns | F03B 13/148 417/332 |
| 2009/0196769 A1* | 8/2009 | Davis, Sr. | F03B 13/1865 417/333 |
| 2009/0243298 A1* | 10/2009 | Jean | F03B 13/148 290/53 |
| 2010/0308589 A1 | 12/2010 | Rohrer | |
| 2011/0038671 A1* | 2/2011 | Hartman | F03B 13/1845 405/68 |
| 2011/0042955 A1* | 2/2011 | Benson | F03B 13/182 290/53 |
| 2011/0278861 A1* | 11/2011 | Yoon | F03B 13/24 290/1 R |
| 2012/0167563 A1* | 7/2012 | Cherepashenets | F03B 13/1855 60/504 |

FOREIGN PATENT DOCUMENTS

| | | |
|---|---|---|
| WO | 97/37123 A1 | 10/1997 |
| WO | 2005/111411 A1 | 11/2005 |
| WO | 2014/026219 A1 | 2/2014 |

* cited by examiner

INSTALLATION FOR THE RECOVERY OF ENERGY FROM SEA SWELL AND/OR THE ACTIVE ATTENUATION OF SAID SWELL

TECHNICAL FIELD OF THE INVENTION

The invention has for object an installation for the recovery of energy from a sea swell and/or the active attenuation of said swell.

It relates to the technical field of hydraulic installations for the use of energy from waves or tides.

PRIOR ART

The creation of a sea swell is done through wind and/or a current that begins to ripple the water on the surface. The propagation of this excitation of the water on the surface makes for the fluid becoming organised increasingly closer in order to provide a propagating wave motion regime.

There are many systems for recovering ocean wave energy that make it possible to recover energy from waves.

For example the CETO technology is known (for example: http://www.carnegiewave.com) wherein underwater buoys in movement (immersed oscillating columns of water) 10 meters under the water, rise, fall and sway as per the waves. Anchored to the bed, their movement actuates a piston, sucks sea water into a turbine or compresses air or oil, which will rotate a motor. The output of this technology is however very low in proportion to the surfaces required.

Installations are also known (for example: http://owc-waveenergy.weebly.com/our-demonstrations.html) wherein, at the end of travel, the waves enter into a caisson where they compress the imprisoned air. This compressed air can then rotate a turbine. In practice, the output of this type of installation is however very limited.

Systems with floating caissons connected together by articulated hinges are further known. The waves displace the caissons in all directions. The energy is recovered on mobile articulations, thanks to pistons actuating pumps. In addition to being cumbersome, this type of installation prevents any navigation in the zone where the floating caissons are installed.

Systems for recovering the energy of currents comprised of a series of rectangular metal panels articulated by a hinge arranged on a base fixed to the seabed are further known. The natural force of the swell causes the constant oscillation of the panels and it is a system of hydraulic pistons built into the hinges which collects the kinetic energy generated as such. The output remains limited.

All of these systems are not reversible: they make it possible to recover the energy from the swell, but cannot attenuate the latter.

Through patent FR 2.906.274 (ACRI IN), an installation for the absorption and/or the recovery of the energy from a sea swell is more particularly known. It comprises a caisson positioned at a given depth in a marine environment. This caisson has a cylindrical tank in which an oscillating plate moves. The latter oscillates according to a vertical axis depending on fluctuations in the height of the water column created by a rip resulting from an incident swell and from a swell reflected by a structure. The tank and the plate delimit a chamber of which the seal is provided by a deformable seal in the form of a bellows.

This caisson has many disadvantages. First of all, the seal is able to be degraded quickly, not only due to the fact of the repeated stresses that it undergoes, but also by the aggressiveness of the marine environment wherein the caisson is immersed. Yet, if the chamber does not remain sealed, the taking of the movement of the swell becomes impossible as the movement of the plate is deactivated. Furthermore, the fastening of the seal on the oscillating plate and on the tank is particularly complex to carry out. Also, the bellows seal limits the movement of the oscillating plate. This caisson therefore can be used only for a swell of low amplitude. Finally, through its operation, it appears that the absorption of the swell can only be limited.

Patent document WO2005/111411 (SEAPOWER) discloses a similar device that makes it possible to recover energy from waves. This device comprises a tank overmounted with a diaphragm designed to bend in response to the action of the waves. This diaphragm has a rigid portion surrounded by an external portion of which the edges are connected in a sealed manner to the upper end of the tank. The space defined by the tank and the rigid portion is therefore sealed by the external portion (29). The latter implies complex joining measures with the tank and limits the movement of the rigid portion.

Patent document FR2970524 (MANSOT) relates to an immersed device for collecting and converting the energy from a swell and from tides. In the embodiments of FIGS. 6 and 7, the device is formed by a chamber wherein a piston moves. Bellows provide the seal. The space defined by the chamber and the piston is sealed by bellows. These bellows induce the same technical problems as those mentioned hereinabove.

Patent document US2010/308589 (ROHRER) relates to an immersed device that makes it possible to convert the energy of a swell. In the embodiment of FIG. 10, the device is formed by a tank wherein a piston moves. The space defined by the tank and the piston is sealed by bellows which induce the same technical problems as those mentioned hereinabove.

Patent document WO97/37123 (BERG) relates to a hydropneumatic electric power plant used to convert the energy from waves. The power plant is formed by a tank wherein a piston moves. The tank and the piston (2) define a chamber. Bellows arranged at the periphery of the piston provide the seal. These bellows induce the same technical problems as those mentioned hereinabove.

The invention aims to overcome these conditions. In particular, an objective of the invention is to improve the design of the caisson with an oscillating plate of the type described in the aforementioned patent FR 2.906.274, in such a way as to make it more reliable and more effective.

Another objective of the invention is to improve the seal of the chamber defined by the tank and the oscillating plate.

Yet another objective of the invention is to propose a caisson of which the design makes it possible to further attenuate the sea swell.

DISCLOSURE OF THE INVENTION

The solution proposed by the invention is an installation comprising at least one caisson positioned at a given depth in a marine environment, said caisson having a rigid tank in which an oscillating plate moves, said oscillating plate being adapted to oscillate in relation to a vertical axis depending on fluctuations in the height of the water column created by the swell perpendicular to said plate, said tank and plate defining a chamber.

This installation is remarkable in that the chamber is sealed by a flexible hermetic pouch which is filled with a gas and deforms according to the oscillations of the oscillating plate, the pressure of the gas inside the pouch being adjusted so as to compensate for all or part of the weight of the water column perpendicular to the plate in the absence of swell.

The use of this flexible pouch makes it possible to avoid any complex joining device between the oscillating plate and the tank, which reduced the risk of damage and improves the reliability and the effectiveness of the caisson. In addition, such a sealed pouch no longer limits the movement of the plate, with the caisson able to be used for swells that have substantial amplitudes of several meters.

Other advantageous characteristics of the invention are listed hereinbelow. Each one of these characteristics can be considered independently of in combination with the remarkable characteristics defined hereinabove, and by subject, where applicable, to divisional patent applications:

- The pouch preferentially has the same internal length and width—or diameter—as the tank.
- The pouch can include several compartments.
- The oscillating plate can be combined with an articulated arm that guides it in its oscillating movement.
- This articulated arm can incorporate a spring mechanism suited for offsetting a portion of the weight of the water column located perpendicular to the oscillating plate in the absence of swell.
- The oscillating plate is preferentially associated with a means for recovering energy suited for recovering the mechanical energy of the oscillating plate.
- The means for recovering energy is advantageously installed at the centre of the tank, with the sealed flexible pouch being conformed around said means for recovering.
- The caisson can be buried in the seabed in such a way that the upper end of the tank is at the same level as said seabed.
- In an alternative embodiment, the caisson is placed on the seabed, the outside walls of the tank have an inclined plane.
- The oscillating plate can also be associated with a means for actuating suited for controlling the movements of said plate in such a way that the latter acts in opposition of phase with the displacement of the water column which is induced by the swell and generates an active attenuation of said sea swell.
- Several adjacent caissons are preferentially arranged in line in the direction of displacement of the swell, with the oscillating plate of each one of these caissons being associated with a means for actuating, with these actuating means being synchronised in such a way that the movement of the oscillating plates generates an artificial counter-swell that acts in opposition of phase with the swell in order to actively attenuate it.
- According to a first embodiment: —a sensor means is arranged upstream of the caissons according to the direction of displacement of the swell, said sensor means is suited for capturing the period and the amplitude of the swell before attenuation; —a means of filtering via anticipation/delay receives as input the signals delivered by the sensor means and delivers as output signals for controlling the means of actuating.
- According to a second embodiment: —a sensor means is arranged downstream of the caissons according to the direction of displacement of the swell, said sensor means is suited for capturing the period and the amplitude of the swell resulting after attenuation; —a means for filtering via retroaction (also called Feedback) receives as input the signals delivered by the sensor means and delivers as output signals for controlling the means of actuating.
- According to a third embodiment: —a first sensor means is arranged upstream of the caissons according to the direction of displacement of the swell, said sensor means is suited for capturing the reference period and the reference amplitude of the swell before attenuation; —a second sensor means is arranged downstream of the caissons according to the direction of displacement of the swell, said sensor means is suited for capturing the error period and the error amplitude of the swell resulting after attenuation; a means of Feedforward filtering comprises an input connected to the first sensor means and another input connected to the second sensor means; a mixing circuit receives as input the signals delivered by the means of Feedforward filtering, and delivers as output signals for controlling the means of actuating.
- According to a fourth embodiment: —a first sensor means is arranged upstream of the caissons according to the direction of displacement of the swell, said sensor means is suited for capturing the reference period and the reference amplitude of the swell before attenuation; —a second sensor means is arranged downstream of the caissons according to the direction of displacement of the swell, said sensor means is suited for capturing the error period and the error amplitude of the swell resulting after attenuation; a means of Feedforward filtering comprises an input connected to the first sensor means and another input connected to the second sensor means; a means of filtering via Feedback retroaction comprises an input connected to the second sensor means; a mixing circuit receives as input the signals delivered by the means of Feedforward filtering and by the means of filtering via Feedback retroaction, and delivers as output signals for controlling the means of actuating.

DESCRIPTION OF THE FIGURES

Other advantages and characteristics of the invention shall appear better when reading the following description of a preferred embodiment, in reference to the annexed drawings, given as informational and non-limiting examples and wherein.

PREFERRED EMBODIMENTS OF THE INVENTION

Figure 1:
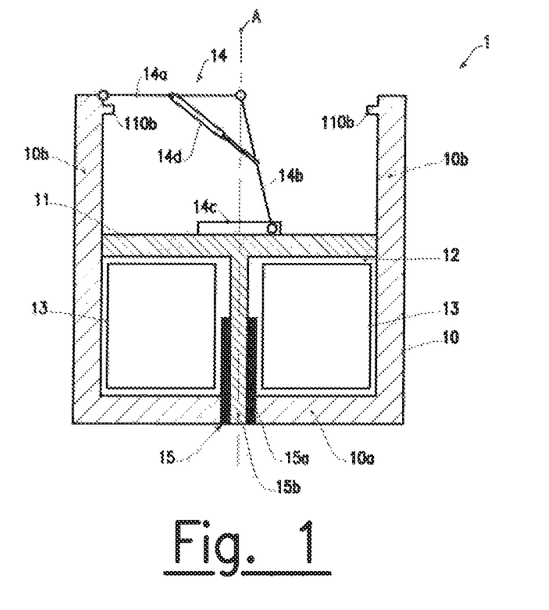
FIG. 1 is a vertical cross-section diagrammatical view of a caisson in accordance with the invention, FIG. 2 diagrams a caisson buried in the seabed, FIG. 3 diagrams a caisson placed on the seabed.

In reference to FIG. 1, the caisson 1 in accordance with the invention comprises a rigid tank 10 in which an oscillating plate moves 11.

The tank 10 has a bottom wall 10a and lateral walls 10b. It is of general cylindrical or parallelepiped shape. In the case of a cylindrical tank, its internal diameter is for example between 2 m and 20 m and its height for example between 3 m and 10 m. In the case of a parallelepiped tank, its internal dimensions can for example be as follows: its length can vary from 2 m to 100 m, its width from 2 m to 10 m and its height from 3 m to 10 m. The thickness of the tank 1 depends on the material chosen, The tank 1 is made from a material that resists the marine environment, such as a metal or a wood coated with a protective layer of the paint type, a plastic, a composite material, etc.

In order to limit the course of the plate 11 and prevent the latter from exiting the tank 10, abutments 110b can be placed on the internal surface of the lateral walls 10b. In FIG. 1, these abutments 110b are placed at the upper end of the lateral walls 10b in order to limit the rising of the plate 11. Bottom abutments can also be installed that make it possible to limit the descent of the plate 11 in the tank 10. These bottom abutments are for example installed about 1 m from the bottom of the tank 10.

The oscillating plate 11 is adjusted to the internal shape of the tank 1 in such a way as to be able to be displaced according to the vertical axis A. It is made from the same material as the tank 10.

At least one piston 15 is associated with the plate 11. This piston 15 is arranged in the tank 10 in such a way as to extend when the plate 11 rises and to retract when said plate descends. In FIG. 1, the piston 15 has the form of a cylinder with telescopic rods of vertical axis A, of which a portion 15b is fixed in relation to the tank 11 and another portion 15b integral with the plate 11.

This piston 15 can operate as a recoverer of energy in such a way as to transform the mechanical energy of the plate 11 into electrical energy. This conversion can for example be carried out by the relative displacement of a magnet and of a solenoid valve integrated into the piston 15. The latter can also operate as an actuator suited for controlling the movements of the plate 11, such as is explained further in the description.

According to an advantageous characteristic of the invention, the plate 11 is associated with an articulated arm 14 suited for guiding it in its oscillating movement according to the vertical axis A. This articulated arm 14 avoids having recourse to complex means for guiding, of the bearing type for example, between the edges of the plate 11 and the internal surface of the lateral walls 10b.

In FIG. 1, the articulated arm 14 comprises: —a first connecting rod 14a of which one end is mounted pivotingly on the upper end of one of the lateral walls 11b; —a second connecting rod 14b of which one end is mounted pivotingly to the other end of the first connecting rod 14a. The other end of the second connecting rod 14b is mounted pivotingly and slidingly in a slide 14c integral with the plate 11.

A member 14d of the piston or cylinder type with telescopic rods, connects the two connecting rods 14a and 14b. This member 14d is placed in such a way as to extend when the plate 11 descends and to retract when said plate rises.

The member 14d can be a motor, i.e. it actuates and sets into motion the connecting rods 14a and 14b in order to oscillate the plate 11. It can furthermore operate as a recoverer of energy, transforming the mechanical energy of the arm 14 into an electrical energy, by means of the relative displacement of a magnet and of a solenoid valve integrated into the member 14d.

The tank 10 and the plate 11 define a chamber 12 of which the volume varies according to the position of the plate 11. The chamber 12 is in fact defined by: the bottom wall 10a of the tank 10, the plate 11 and the lateral walls 10b of said tank. It is sealed by a sealed flexible pouch—or bladder—13 filled with a gas and which is deformed according to the oscillations of the plate 11. In practice, it appears that this seal is more robust that that described in the aforementioned patent FR 2.906.274.

This flexible pouch 13 is for example made of rubber or of another elastic polymer, possible reinforced with fibres, and of which the thickness is for example between 10 mm and 100 mm. The pouch 13 has the same internal length and width (or diameter) as the tank 10. It can include one or several compartments in such a way that if one of the compartments were to be pierced, the others can continue to ensure their function.

The gas used is typically air, but any other compressible gas can be used, such as oxygen for example. To this effect, the pouch 13 is provided with one or several valves allowing for its inflation and/or its purge according to the internal pressure set.

The pouch 13 is installed simply inside the tank 10. In order to ensure its maintaining in position, its upper portion can however be fastened to the plate 11 and its lower portion to the bottom wall 10a. This fastening is carried out by any means of attaching convenient to those skilled in the art.

When the piston 15 is installed at the centre of the tank 10, the flexible pouch 13 is conformed around said piston. The flexible pouch 13 can for example have the shape of a sort of toroid, the piston 15 being installed at the centre of said toroid.

The caisson 1 is positioned at a given depth in a marine environment, for example at a depth between 2 m and 30 m. Through its design, the caisson 1 can be arranged in shallow water, for example at a depth h (FIG. 2) less than 15 m.

The propagation of the swell on the surface does not generally depend on the seabed, except when this bed becomes increasingly shallower and when the height of the swell becomes, in proportion, substantial with respect to the height of the water column linked to this depth. That is the reason for which, starting from a certain depth, the effect of the seabed on the amplitude of the swell becomes increasingly significant when approaching the coast (beaches, rocks, . . . ). If the seabed has a boss, the latter will amplify the swell. On the contrary, if the seabed has a hollow, the latter will attenuate the swell. It can therefore appear advantageous that a tank 10 installed in the seabed only minimally disturbs the swell.

Figure 2:
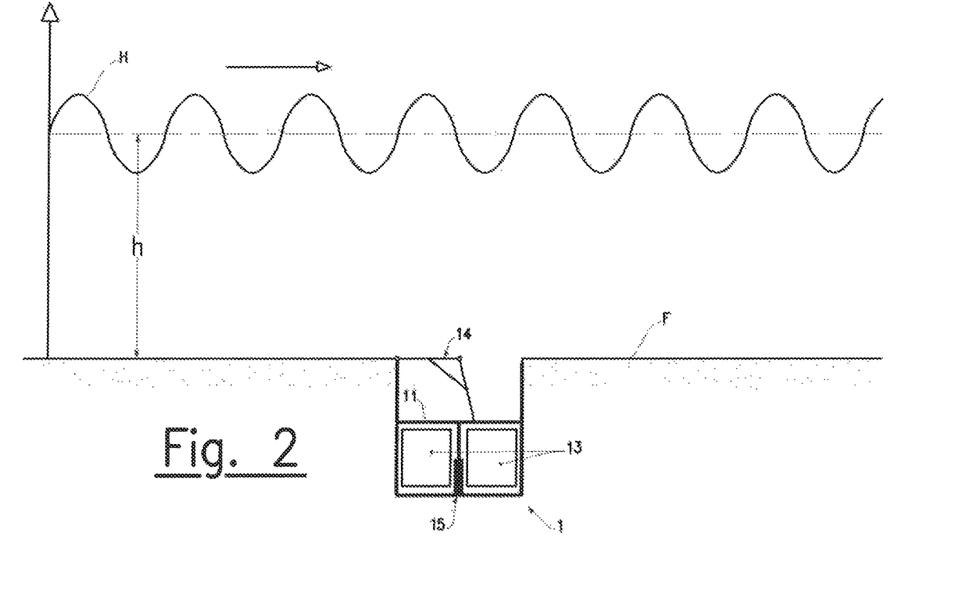

In FIG. 2, the caisson 1 is buried in the seabed F in such a way that the upper end of the tank 10 is at the same level as said seabed. This configuration is that which disturbs the marine environment and the swell the least. Implementing it can however be complicated as it requires digging the seabed in order to install the caisson 1.

Figure 3:
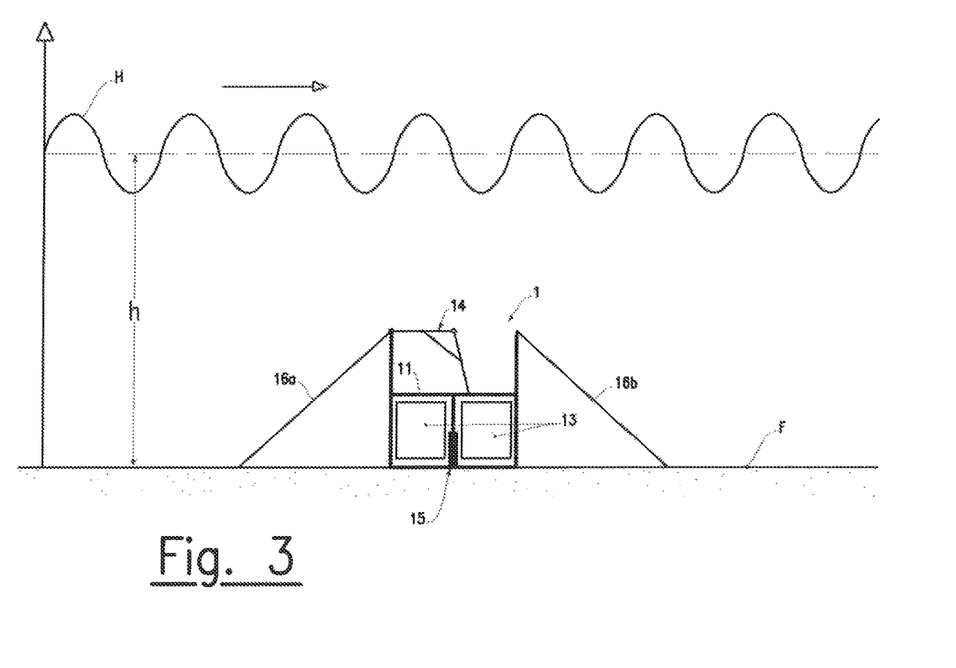

In FIG. 3, the caisson 1 is placed on the seabed F, with the outer lateral walls of the tank 10 having an inclined plane 16a, 16b. These inclined planes 16a, 16b are oriented in the direction of displacement of the swell. They have a top point arranged on the upper end of the tank 10 and a low point separated from said tank and arranged on seabed F. These inclined planes 16a, 16b make it possible to prevent, or in the least to limit, the amplifying discontinuities on the swell by the effect of the seabed. If the first inclined plane 16*a* that the swell encounters tends to amplify it, the second inclined plane 16*b* suppresses it, by bringing the water column to its initial level.

Figure 4A:
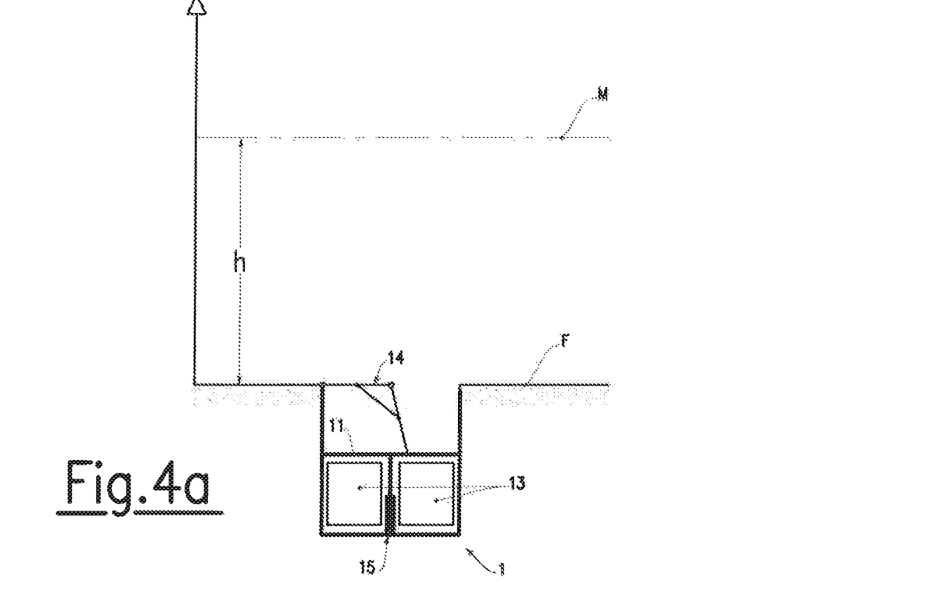
FIGS. 4a to 4d show the successive movements of the oscillating plate during the passage of a wave of the swell, FIG. 5 diagrams a first configuration of installation for an active attenuation of the swell according to a control of the anticipation/delay type, with the period of this swell being short.
Figure 4B:
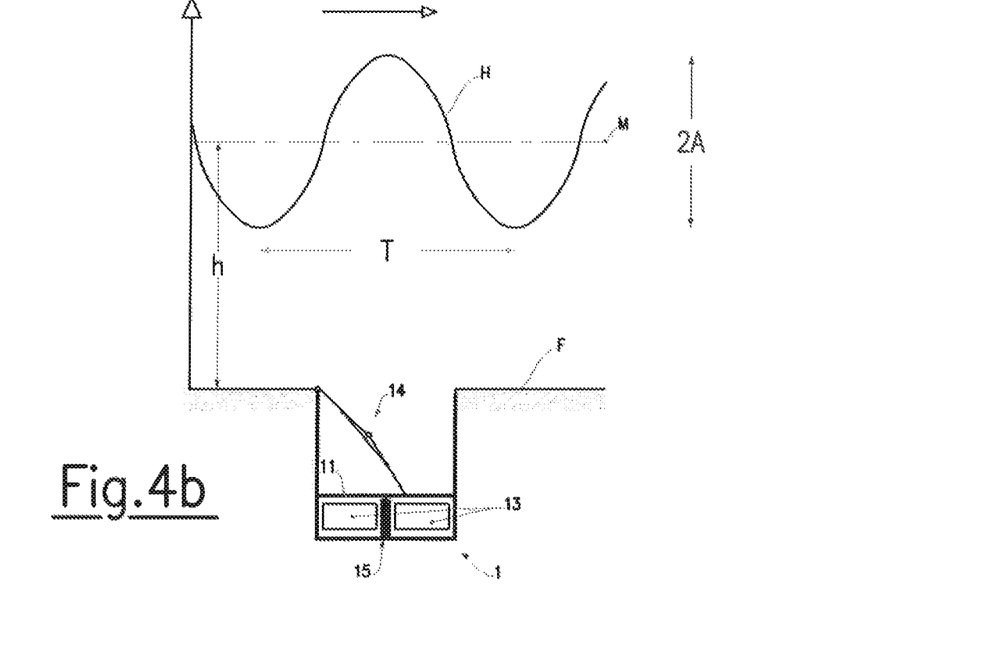
Figure 4C:
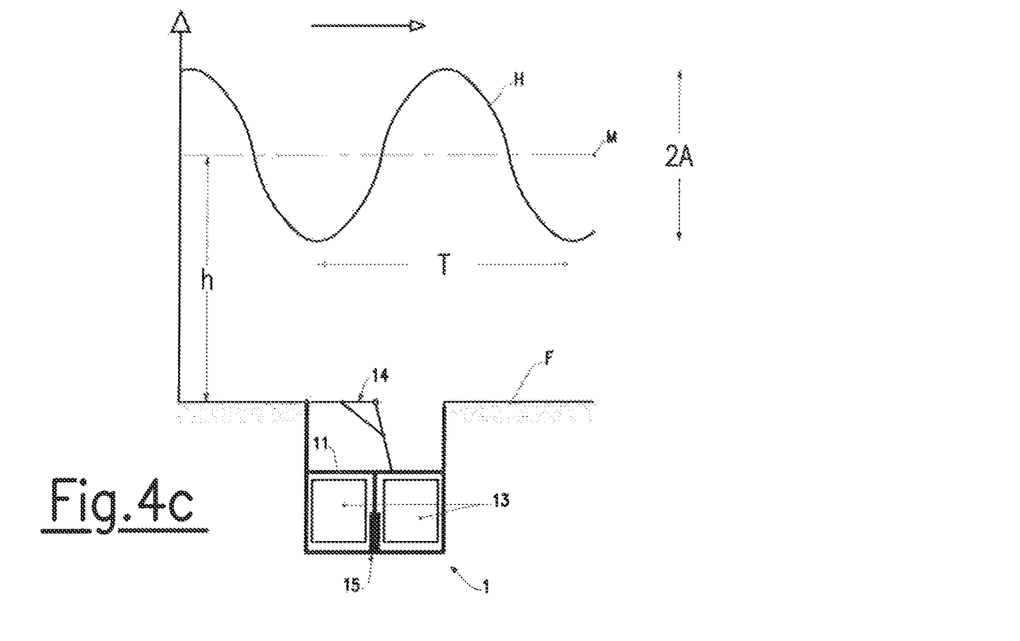

FIGS. 4*a* to 4*c* show the behaviour of the caisson 1 in recovery mode of the energy of the swell. The caisson 1 is buried in the seabed F in a configuration similar to that of FIG. 2.

In FIG. 4*a*, the line M diagrams the level of the sea at rest, in the absence of a swell. The weight of the water column located perpendicular to the oscillating plate 11 tends to lower the latter towards bottom of the tank 10. This is a static pressure that the plate 11 undergoes. In accordance with the invention, the flexible pouch is inflated 13 in such a way that the pressure of the gas inside the pouch offsets this static pressure. In this way, the plate 11 is in equipotential balance with the static pressure and undergoes only the dynamic pressure linked to the fluctuations of the water column induced by the swell. In practice, the pressure of the gas in the pouch 13 is adjusted in such a way that the balanced position of the plate 11 is located substantially in the middle of the tank 10.

A portion of the static pressure linked to the weight of the water column located perpendicular to the plate 11, can also be taken by the articulated arm 14. To do this, the latter can integrate a spring mechanism adapted to offset a portion of this static pressure, said spring is for example installed in the member 14*d*.

In FIG. 4*b*, a swell H with wavelength (or period) T, and of amplitude 2A is shown. When a crest of the swell H passes over the caisson 1, the height of the water column increased by A. The plate 11 undergoes an equivalent force which pushes it to the bottom of the tank 10, compressing the pouch 13. The plate 11 descends by a distance A in relation to the configuration of FIG. 4*a*.

In FIG. 4*c*, the crest of the swell H passes the caisson 1, the height of the water column returns to its neutral level of FIG. 4*a*. The plate 11 and the pouch 13 return to their balanced position. The plate 11 rises a distance A in relation to the configuration of FIG. 4*b*.

When a hollow of the swell H passes over the caisson 1 (FIG. 4*d*), the height of the water column decreased by A. The plate 11 undergoes the lower pressure. It rises towards the top of the tank 10, and the pouch 13 expands. The plate 11 rises by a distance A in relation to the configuration of FIG. 4*c*.

Figure 4D:
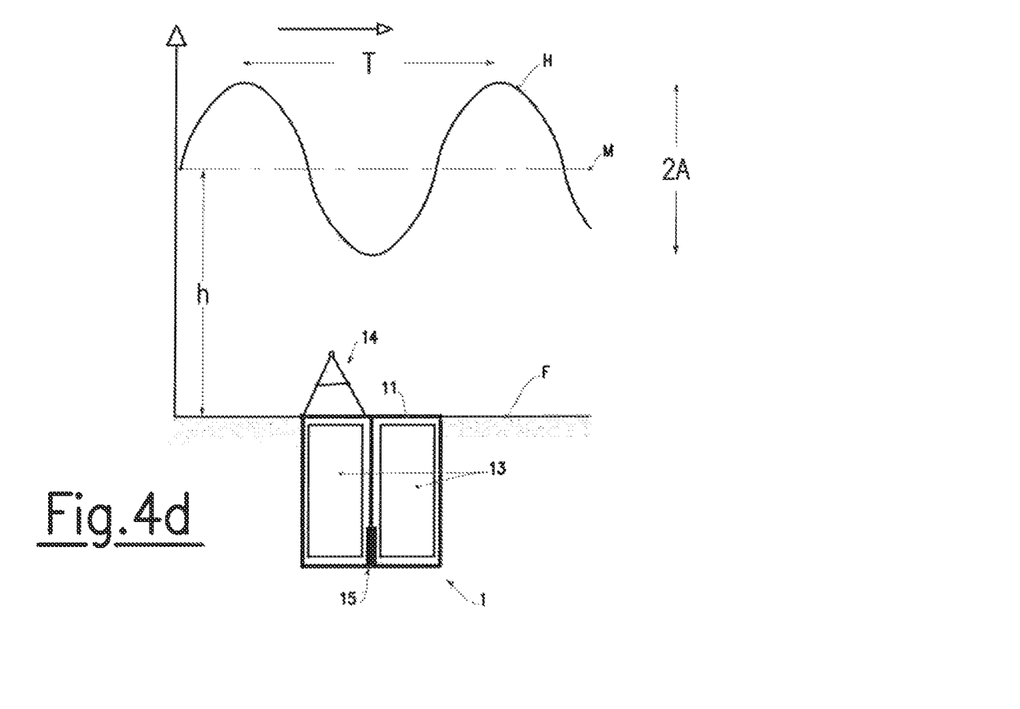

With the plate 11 oscillating naturally according to the axis A depending on fluctuations in the height of the water column created by the swell perpendicular to said plate, it is easy to recover this energy on piston 15 and/or the member 14*d*.

The movement of the plate 11, and therefore the height of the tank 10, is calculated for a strong swell which is statistically given at 4 m, i.e. 2A=4 m. For a swell greater than 4 m, the bottom and top positions of the plate 11 will be defined by the aforementioned abutments, preventing in this way any risk of damaging and/or destroying the caisson 1.

The caisson 1 is reversible, i.e. it can also be used to attenuate the swell, and no longer for capturing its energy. In this case, as is explained more in reference to FIGS. 5 to 8, the plate 11 no longer undergoes the fluctuations of the height of the water column created by the swell, and the piston 15—and/or the articulated arm 14—becomes an actuator. The latter controls the movements of the plate 11 in such a way that it acts in opposition of phase with the displacement of the water column which is induced by the swell and generates an active attenuation of said sea swell.

The principle consists in generating an artificial counter-swell placed in opposition of phase with the primary swell in order to cancel or reduce the effects thereof. By way of example, it is as such possible to "break" large waves during a storm in order to protect dikes and/or coasts and to adapt in real time to any type of swell (which is not allowed by a static system adjusted for a given wavelength).

In the FIGS. 5 to 9, several caissons 1 are positioned next to one another on seabed F. These adjacent caissons 1 are arranged in line in the direction of displacement of the swell H, with this direction diagrammed by the arrow. This line corresponds to the normal crest line of the swell H that propagates to the coast to be protected.

The caissons 1 are identical to the one described in reference to FIG. 1, with their oscillating plate 11 being associated with a piston 15. They form sealed hydraulic enclosures similar to the acoustic enclosures, and which are capable of displacing water columns. These actuators 15 are synchronised to generate in real time an artificial counter-swell CH that actively attenuates the swell H.

The synchronisation of the actuators 15 is carried out thanks to the a control of the swell H in real time, said control is carried out by using four types of laws: anticipation/retard, Feedforward, Feedback, and Feedforback. These filtering techniques are usually used in acoustics for reducing noise and are for example described in patent EP 0.852.793 (TECHNOFIRST), or in the publications Ch. CARME, "The third principle of active control: the FEED FORBACK®", Active 99; MIYASAKI et al, "Consideration about feedback and feedforward control for active control of micro-vibratiori", $2^{nd}$ international conference on vibration control, Yokohama 1994, and all of the bibliographic references relating to it. Those skilled in the art can refer to these patents and works. The invention aims as such to transpose in a non-evident manner these filtration techniques to macro-vibrations (swell) although they are normally used for micro-vibrations.

Figure 5:
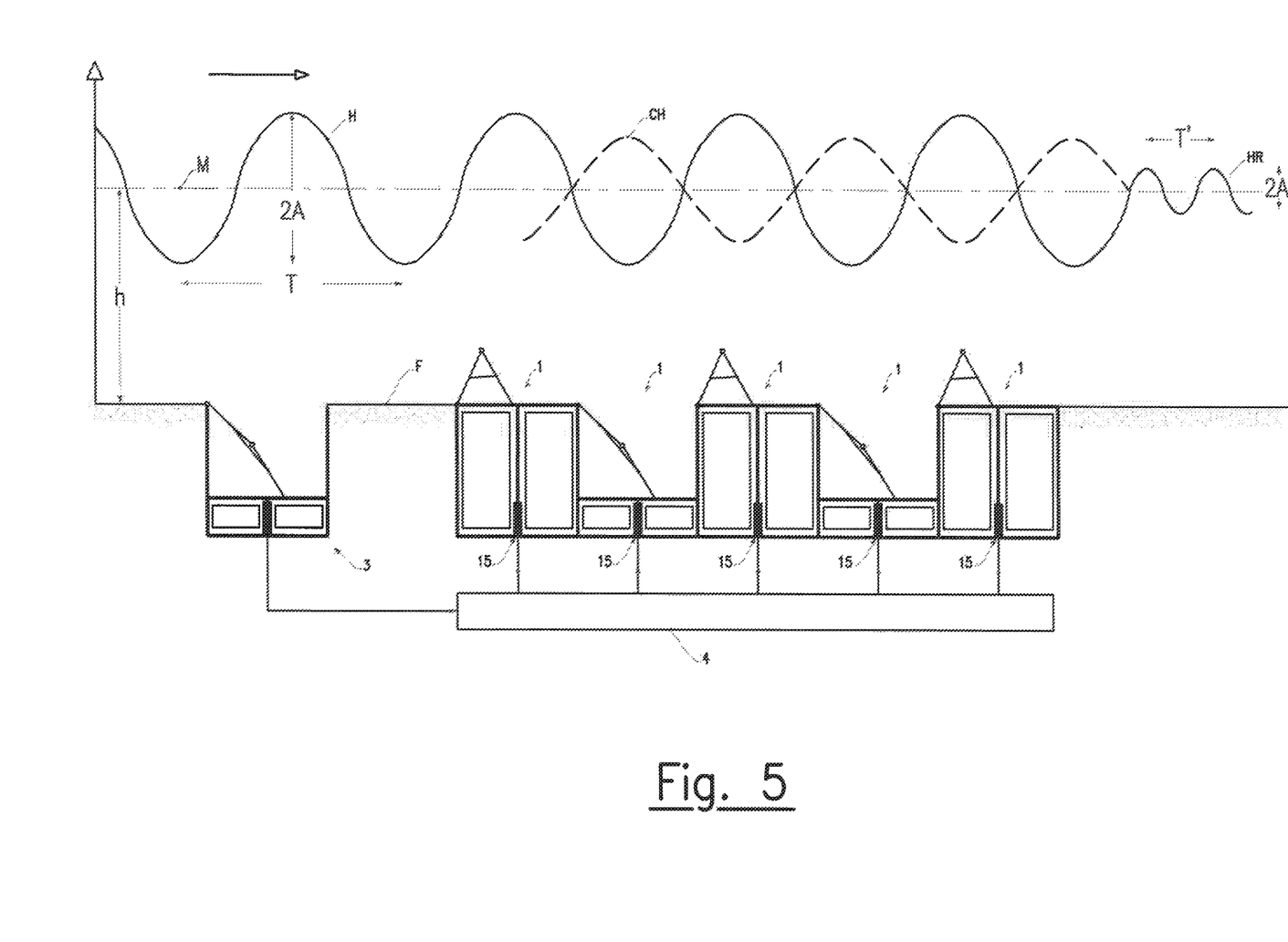
Figure 6:
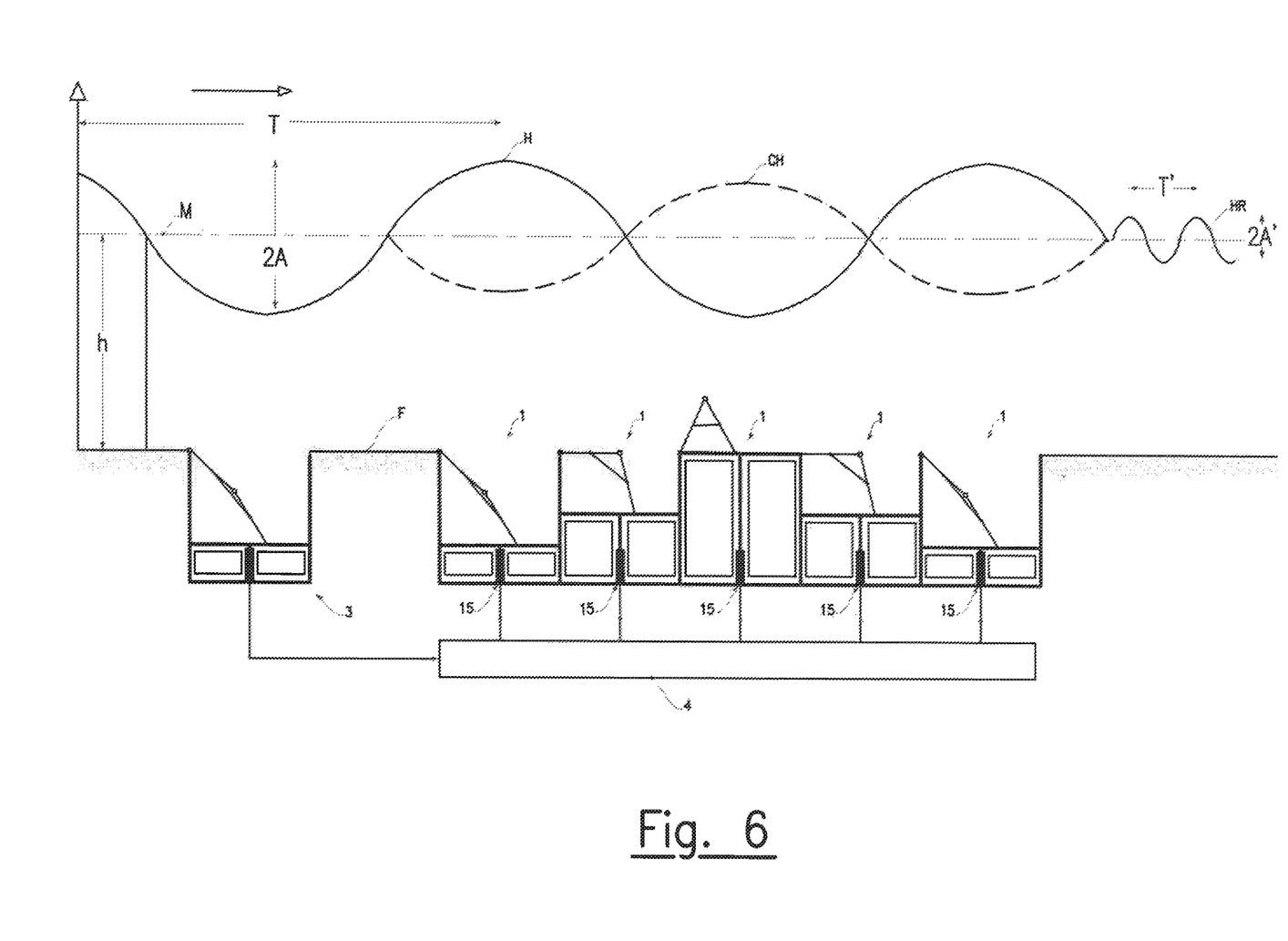
FIG. 6 shows the active response of the installation of FIG. 5 for a swell of which the period is long, FIG. 7 diagrams a second installation configuration for an active attenuation of the swell according to a control of the Feedback type, FIG. 8 diagrams a third installation configuration for an active attenuation of the swell according to a control of the Feedforward type, FIG. 9 diagrams a fourth installation configuration for an active attenuation of the swell according to a control of the Feedforback type.

FIG. 5 shows a control of the anticipation/delay type. The principle consists in analysing the swell before attenuation in order to adapt, in real time or not, the movement of the plates 11 in such a way as to further optimise the attenuation.

A sensor means 3 is arranged upstream of the caissons 1 according to the direction of displacement of the swell H. This sensor means 3 is suited for capturing the period T and the amplitude 2A of the swell before attenuation. This sensor means 3 is preferentially a caisson in accordance with the invention of which the oscillating plate oscillates by undergoing the fluctuations of the height of the water column created by the swell H perpendicular to said plate.

All of the actuators 15 are connected to a means of filtering 4 by anticipation. The latter has for example the form of one or more printed circuits that may integrate a processor and a memory wherein are recorded program of which the instructions, when they are executed by said processor, make it possible to directly or indirectly control the actuators 15, and more particularly a forced rise and/or descent of the plates 11.

The means for filtering 4 receives as input the signals delivered by the sensor means 3 and delivers as output signals in order to control the actuators 15. The output signals are generated by applying to the input signals a filtering algorithm of the anticipation/delay type conventionally used in the technical field of acoustics.

The movement of the plates 11 is as such forced in such a way that they generate an artificial counter-swell CH that acts in opposition of phase with the swell H in order to actively attenuate it. The resulting swell HR has a period T'<T and an amplitude 2A'<2A.

The best results are obtained when the series of caissons 1 has a length at least equal to twice the period T of the swell H to be attenuated. It is as such possible to create a counter-swell HC over two periods T. However, for a swell H of which the period is longer (FIG. 6), and wherein the series of caissons can generate a counter-swell CH only over a single period, good results are however obtained, with the amplitude 2A' of the resulting swell HR being substantially reduced in relation to the amplitude 2A of the swell H. Of course it is possible to add one or several other series of caissons downstream of this first series, in such a way as to further improve the attenuation.

Figure 7:
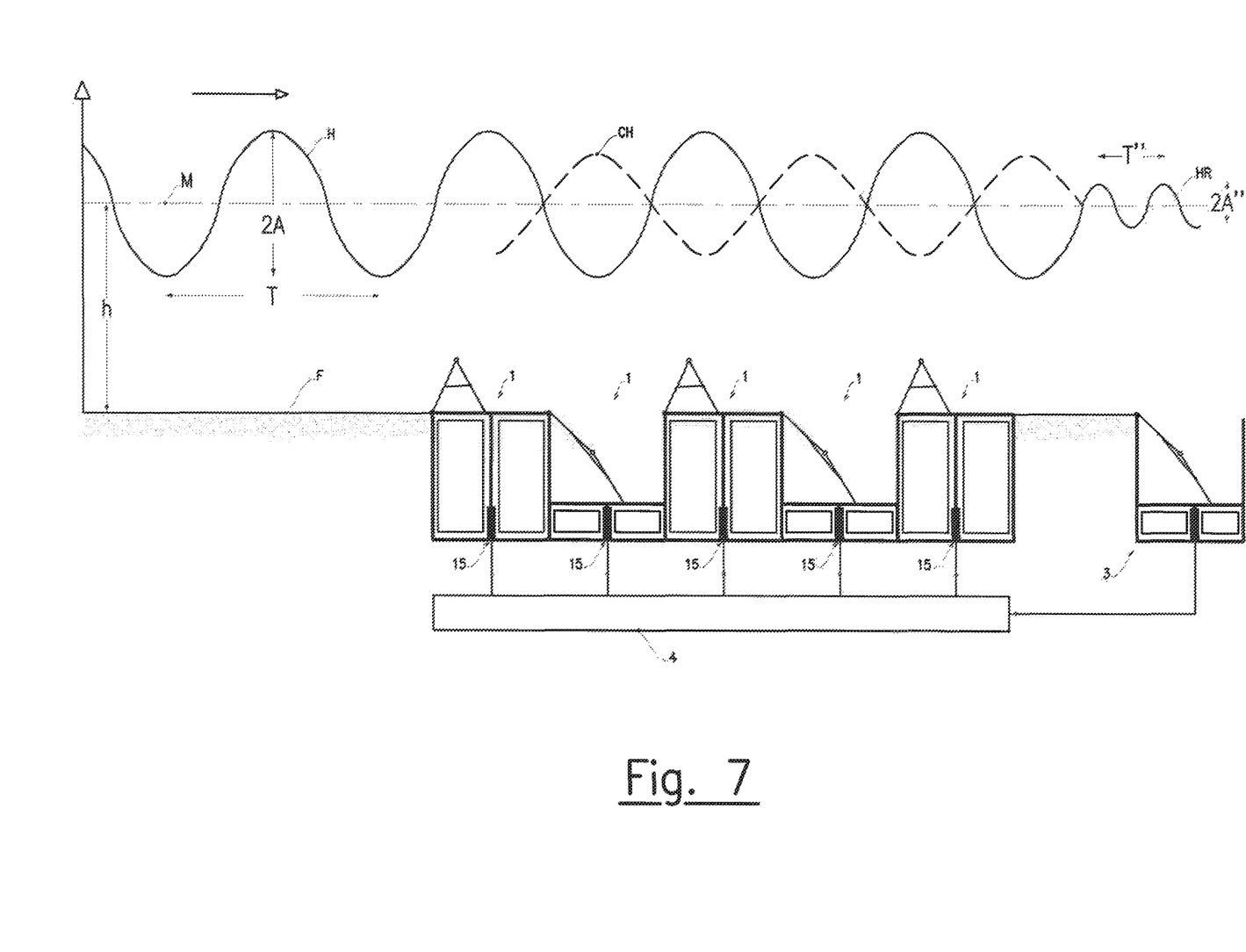

The FIG. 7 shows a control of the Feedback type. The principle consists this time in analysing the swell after attenuation in order to adapt, in real time or not, the movement of the plates 11 in such a w<au as to further optimise the attenuation.

A sensor means 3 is here arranged downstream of the caissons 1 according to the direction of displacement of the swell H. This sensor means 3 is suited for capturing the period T' and the amplitude 2A' of the swell HR after attenuation. This sensor means 3 is preferentially a caisson in accordance with the invention of which the oscillating plate oscillates by undergoing the fluctuations of the height of the water column created by the swell H perpendicular to said plate.

The means of Feedback filtering 4 is of the retroaction type and has the same form as that described hereinabove. It receives as input the signals delivered by the sensor means 3 and delivers as output the signals for controlling the actuators 15. The output signals are generated by applying to the input signals an algorithm of filtering via Feedback retroaction used in the technical field of acoustics.

The plates 11 as such generate an artificial counter-swell CH that acts in opposition of phase with the swell H in order to actively attenuate it. The resulting swell HR has a period T"<T and an amplitude 2A"<2A.

A Feedback filtering makes it possible to obtain a better attenuation of the swell with a filtering via anticipation/delay: T"<T' and 2A"<2A'. However, for certain periods of the swell, there is a risk of generating rejection phenomena that tend to increase at least the amplitude of the swell. The Feedforward filtering is on this point more stable.

Figure 8:
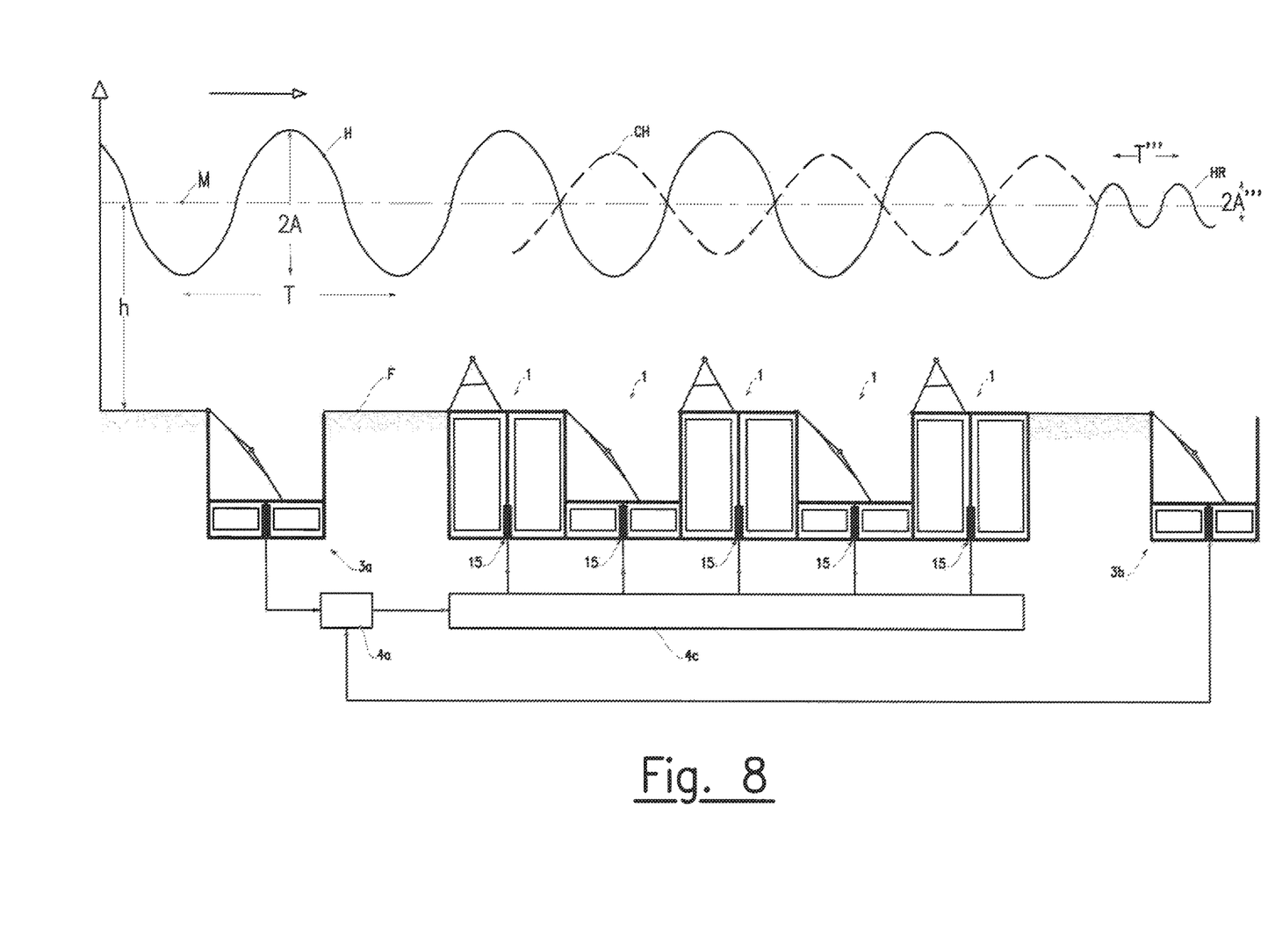

FIG. 8 shows a control of the Feedforward type. The principle consists in minimising the amplitude of the swell captured by a sensor means arranged downstream of the caissons 1.

A first sensor means 3a is arranged upstream of the caissons 1 according to the direction of displacement of the swell H. This first sensor means 3a is suited for capturing the period T and the amplitude 2A of the swell H before attenuation.

A second sensor means 3b is arranged downstream of the caissons 1 according to the direction of displacement of the swell H. This second sensor means 3b is suited for capturing the error period T''' and the error amplitude 2A''' of the resulting swell HR after attenuation.

A means of Feedback filtering 4a comprises an input connected to the first sensor means 3a and another input connected to the second sensor means 3b.

A mixing circuit 4c receives as input the signals delivered by the means of Feedforward filtering 4a, and delivers as output signals for controlling the means of actuating 15.

In practice, the first sensor means 3a makes it possible to deliver a signal to the Feedforward means of filtering 4a that will deliver an input signal to the mixing means 4c. At the same time an adaptation in real time of the filtering means 4a can be considered for the purposes of taking into account any variations in the amplitude 2A''' and/or in the period T''' of the resulting swell HR.

Figure 9:
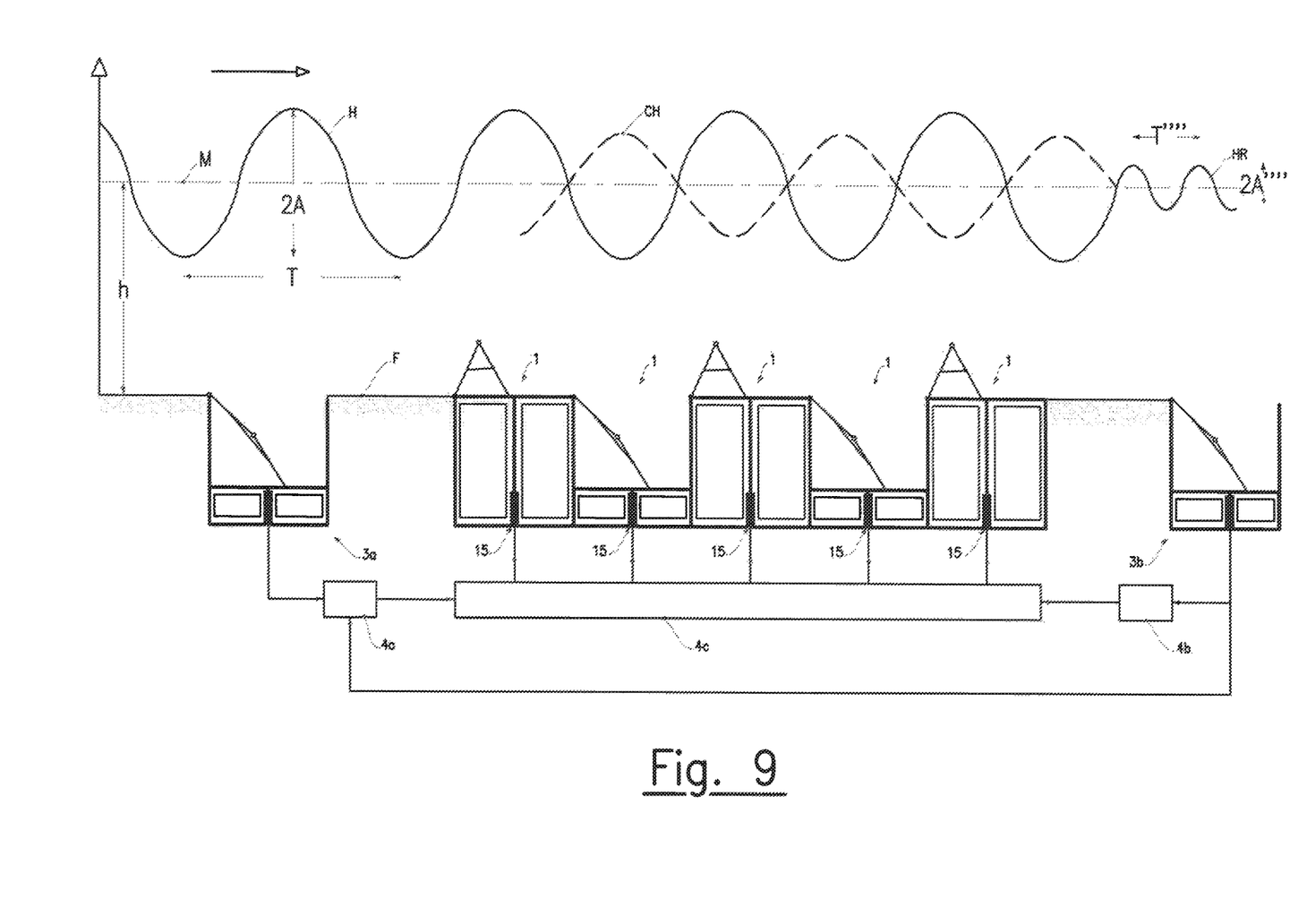

A filtering of the Feedforback type is a combination of a Feedforward filtering and a Feedback filtering. The principle consists this time on analysing the swell before and after attenuation in order to adapt, in real time or not, the movement of the plates 11 in such a way as to further optimise the attenuation. This type of control makes it possible to retains, and even improve, the attenuation in Feedback mode, which still improving the stability, with the phenomena of rejection being set aside. The installation of FIG. 9 shows a control of the Feedforback type.

A first sensor means 3a is arranged upstream of the caissons 1 according to the direction of displacement of the swell H. This first sensor means 3a is suited for capturing the reference period T and the reference amplitude 2A of the swell H before attenuation.

A second sensor means 3b is arranged downstream of the caissons 1 according to the direction of displacement of the swell H. This second sensor means 3b is adapted to capture the error period T"" and the error amplitude 2A"" of the resulting swell HR after attenuation.

A means of Feedback filtering 4a by anticipation receives as input the signals delivered by the first sensor means 3a and the signals delivered by the second sensor means 3b.

A means of filtering 4b via Feedback retroaction receives as input the signals delivered by the second sensor means 3b.

A mixing circuit 4c receives as input the signals delivered by the means of Feedforward filtering 4a and by the means of filtering via Feedback retroaction 4b, and delivers as output signals for controlling the means of actuating 15. These output signals are generated by applying to the input signals an algorithm of Feedforback filtering that is conventionally used in the technical field of acoustics.

The filtering means 4a and 4b and the mixing circuit 4c have for example the form of one or several printed circuits that may integrate a processor and a memory wherein are recorded programs of which the instructions, when they are executed by said processor, make it possible to directly or indirectly control the actuators 15, and more particularly a forced rise and/or descent of the plates 11. The resulting swell HR has a period T""<T and an amplitude 2A""<2A.

This Feedforback filtering makes it possible to obtain a better attenuation of the swell than with a Feedforward or Feedback filtering: T""<T"<T' and 2A""<2A"<2A'.

In a shallow sea and with a low swell, the series of caissons 1 generating the counter-swell CH can be reduced to a single caisson. Having several adjacent caissons makes it possible however to adapt quickly to different wavelengths (period T) and different amplitudes 2A of the swell H, without having to resize each time the dimensions of the caisson in order to adapt to said swell to be treated.

When the swell H passes over the caissons 1, there is a passive attenuation linked to the mass-spring system that the piston 15 and the flexible pouch 13 form.

The arrangement of the various elements and/or means and/or steps of the invention, in the embodiments described hereinabove, must not be understood as requiring such an arrangement in all of the implementations. In any case, it is understood that various modifications can be made to these elements and/or means and/or steps, without leaving the idea and the scope of the invention. In particular:

The tank 1 does not necessarily have a general cylindrical and parallelepiped shape. It can for example be curved.

Several pistons 15 can be integrated into the tank 10.

The piston 15 can be replaced with any other means for recovering energy and/or actuator convenient for those skilled in the art.

The articulated arm 14 can be use alone, instead of and in place of the flexible pouch 13, in order to offset any or all of the static pressure linked to the weight of the water column located perpendicular to the plate 11 in the absence of a swell.

The articulated arm 14 can be used alone, instead of and in place of the piston 15, as an actuating means of the plate 11.

a caisson 1 of which the oscillating plate 11 is combined with two separate means that make it possible to offset all or a portion of the weight of the water column located perpendicular to said oscillating plate in the absence of swell.

In order to improve the acquisition of the period and amplitude of the swell to be treated, sensor means 3, 3a, 3b can each be formed of series of caissons 1 of which the length corresponds to at least once, preferentially twice the period of said swell.

The sensor means 3, 3a, 3b can have the form of pressure sensors, such as for example a hydrophone that makes it possible to instantly measure the dynamic height of the water column (or dynamic pressure of the swell).

The invention claimed is:

1. Installation comprising:
    at least one caisson positioned at a given depth in a marine environment, said caisson having a rigid tank in which an oscillating plate moves, said oscillating plate being adapted to oscillate in relation to a vertical axis depending on fluctuations in the height of the water column created by the swell perpendicular to said plate, said tank and plate defining a chamber,
    wherein a flexible hermetic pouch is installed inside the tank so as to seal the chamber, the pouch is filled with a gas and deforms according to the oscillations of the oscillating plate, the pressure of the gas inside the pouch being adjusted so as to compensate for all or part of the weight of the water column perpendicular to the plate in the absence of swell.

2. Installation according to claim 1, wherein the pouch has the same internal length and width—or diameter—as the tank.

3. Installation according to claim 1, wherein the pouch comprises several compartments.

4. Installation according to claim 1, wherein the oscillating plate is combined with an articulated arm that guides it in its oscillating movement.

5. Installation according to claim 4, wherein the articulated arm integrates a spring mechanism suited for offsetting a portion of the weight of the water column located perpendicular to the oscillating plate in the absence of a swell.

6. Installation according to claim 1, wherein the oscillating plate is associated with an electrical generator or pump suited for recovering the mechanical energy of said plate.

7. Installation according to claim 6, wherein the means for recovering energy is installed at the centre of the tank, with the sealed flexible pouch being conformed around said means of recovery.

8. Installation according to claim 1, wherein the caisson is buried in the seabed in such a way that the upper end of the tank is at the same level as said fond.

9. Installation according to claim 1, wherein the caisson is placed on the seabed (F), with the outer lateral walls of the tank having an inclined plane.

10. Installation according to claim 1, wherein the oscillating plate is associated with a means for actuating suited for controlling the movements of said plate in such a way that the latter acts in opposition of phase with the displacement of the water column which is induced by the swell and generates an active attenuation of said sea swell.

11. Installation according to claim 10, wherein:
    several adjacent caissons are arranged in line in the direction of displacement of the swell, the oscillating plate of each one of these caissons is associated with a means for actuating, the actuating means are synchronised in such a way that the movement of the oscillating plates generates an artificial counter-swell that acts in opposition of phase with the swell in order to actively attenuate it.

* * * * *